United States Patent [19]
Lee

[11] Patent Number: 6,104,436
[45] Date of Patent: Aug. 15, 2000

[54] METHOD AND APPARATUS FOR DISPLAYING SUBCHANNEL INFORMATION IN A DIGITAL TV RECEIVER

[75] Inventor: Hyoung-Joo Lee, Seoul, Rep. of Korea

[73] Assignee: Samsung Electronics Co., Ltd., Suwon, Rep. of Korea

[21] Appl. No.: 09/033,006

[22] Filed: Mar. 2, 1998

[30] Foreign Application Priority Data

Jun. 30, 1997 [KR] Rep. of Korea ............ 97-29926

[51] Int. Cl.[7] .................................................. H04N 5/445
[52] U.S. Cl. ........................................... 348/563; 348/569
[58] Field of Search .................... 348/569, 906, 348/563, 564; H04N 5/445, 5/50

[56] References Cited

U.S. PATENT DOCUMENTS 5,786,869 7/1998 Baek ...................................... 348/565

*Primary Examiner*—Sherrie Hsia
*Attorney, Agent, or Firm*—Staas & Halsey LLP

[57] ABSTRACT

A method and apparatus for use in a digital multichannel television (TV) receiver and for displaying subchannel information, such that the method includes the steps of detecting the list of broadcasting programs of the subchannels of a currently selected RF channel to check whether the number of the programs are changed, and displaying the information about newly added programs on the TV screen when the number of the programs are changed. When a new program is added, a corresponding icon displayed on a screen of the digital multichannel TV receiver includes a title and/or a channel (program) number of the newly added program.

16 Claims, 3 Drawing Sheets

METHOD AND APPARATUS FOR DISPLAYING SUBCHANNEL INFORMATION IN A DIGITAL TV RECEIVER

BACKGROUND OF THE INVENTION

1. Field of the Invention

The present invention relates to a digital TV set for receiving a multichannel television signal, and more particularly, to a method and apparatus for displaying channel information on a TV screen.

2. Description of the Related Art

In analog TV broadcasting such as an NTSC (National Television System Committee) system, only one program can be transmitted through a specified frequency band of an RF channel.

On the contrary thereto, in a digital TV broadcasting system for a next generation system such as an HDTV (High Definition TV), the number of RF channels is much greater than in the analog TV broadcasting system. Furthermore, the bit rate required can be allocated to a needed service when necessitated. That is, a plurality of programs can be transmitted over a limited transmission bandwidth of an RF channel. For example, the existing standard definition television (SDTV) programs such as analog TV broadcast can be planned on multichannels for a period of time, and the HDTV programs on a single channel for another time zone. Such an example is referred to as the ATSC (United States Advanced Television System Committee) Standard. According to the ATSC standard, it is recommended that subchannels of at least one HD program plus six SD programs at a maximum can be broadcast on an RF channel corresponding to an existing analog channel.

Besides, the number of subchannel programs transmitted through each RF channel can be also changed while a user is watching TV. For example, a TV broadcast with three SD programs can be additionally added by a further SD program, thereby being changed to a TV broadcast with four SD programs, and on the contrary, to a single HD program. For reference, since it hardly ever occurs that several programs are simultaneously added or terminated, it is assumed in most cases that one or another program is added or cancelled.

As described above, since multiple programs can be broadcast on a single RF channel in the digital multichannel TV broadcasting, in which the number of programs can be changed at any time, it is necessary to display program guide information on the screen of a digital TV set, so that user can select one from among several programs. For this purpose, the ATSC standard provides for a unique electronic program guide (EPG) for program selections. That is, TV broadcast stations transmit EPG information on every RF channel, and digital TV sets receive and store the EPG information so as to display it on a screen when requested by user.

The user can check the list of programs transmitted through subchannels of a certain RF channel by means of such EPG information, but the user must check an extra EPG information screen for that purpose. Therefore, when programs of subchannels are changed, a user can not be immediately advised thereof.

As aforementioned, it is a drawback of the prior art that a user misses useful desired programs because the user can not be immediately informed of changed programs of subchannels in digital multichannel TV broadcasting.

SUMMARY OF THE INVENTION

Accordingly, it is an object of the present invention to provide a subchannel information displaying method capable of furnishing a user with information about a program change of subchannels during the watching of a digital television.

Additional objects and advantages of the invention will be set forth in part in the description which follows and, in part, will be obvious from the description, or may be learned by practice of the invention.

According to the present invention, a method for displaying subchannel information comprises the steps of detecting the list of broadcasting programs of the subchannels of a currently selected RF channel to check whether the number of the programs has changed, and displaying the information about newly added programs on a TV screen when the number of the programs has changed.

BRIEF DESCRIPTION OF THE DRAWINGS

The present invention will now be described more specifically with reference to the drawings attached only by way of example.

DETAILED DESCRIPTION OF THE PREFERRED EMBODIMENT

Reference will now made in detail to the present preferred embodiments of the present invention, examples of which are illustrated in the accompanying drawings. The embodiments are described below in order to explain the present invention by referring to the figures.

Figure 1:
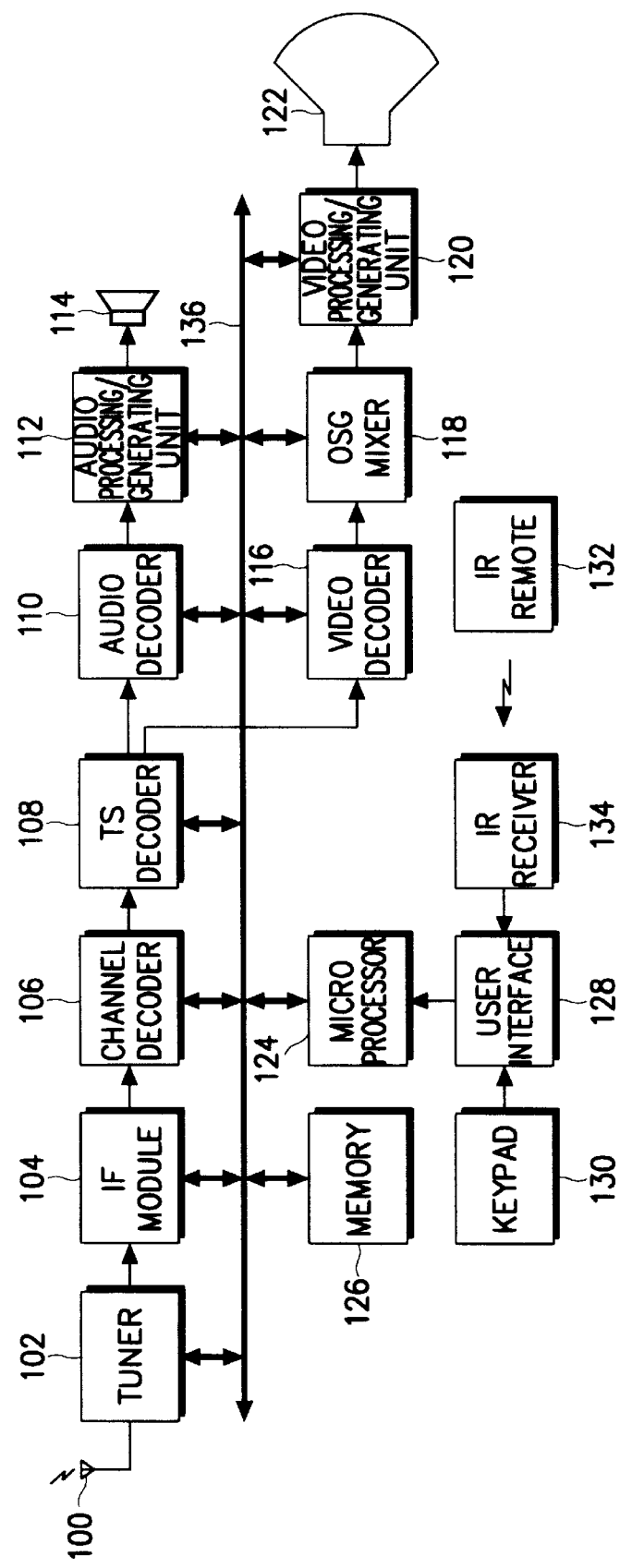
FIG. 1 is a block diagram of an HDTV receiver as a digital TV set adopting the MPEG (Moving Picture Expert Group) standard according to an embodiment of the present invention.

Referring to FIG. 1, a tuner 102 selects one RF channel among broadcasting signals received through an antenna 100 under the control of a microprocessor 124. Thereupon, the tuner 102 outputs an IF (intermediate frequency) signal of the selected channel, which is converted by the IF module 104 into a baseband signal so as to then be delivered to a channel decoder 106. The channel decoder 106 converts the baseband signal to a channel signal to reconstruct data bit strings. Such reconstructed data bit strings are separated into audio data, video data, and auxiliary data by a TS (transport stream) decoder 108.

The above audio data are delivered to an audio decoder 110 so as to be decoded in accordance with the MPEG standard or the Dolby AC-3 standard, whereupon the resulting signals are processed by an audio processing/generating unit 112 so as to be output as audible sound through a speaker 114. Besides, the video data are delivered to a video decoder 116 so as to be decoded in accordance with the MPEG standard, whereby the resulting signal is applied to an OSG (On Screen Graphic) mixer 118 to be mixed with OSG data under the control of the microprocessor 124 and then processed by a video processing/generating unit 120. The video processed data is being displayed on a screen 122 through a picture tube. The OSG data are used for displaying various information in the form of graphic and text on the screen 122 under the control of the microprocessor 124.

The microprocessor 124, as the controller of the HDTV set, is connected with a keypad 130 and an IR (infrared)

receiver 134 through a user interface 128. The microprocessor 124 performs operations based on commands input from the keypad 130 and the IR remote 132 via the IR receiver 134 according to a program stored in the memory 126. The IR remote 132 is a cordless mouse, such as an air mouse, or a remote controller. The commands input from the IR remote 132 are transmitted in the form of an IR signal to the IR receiver 134 to be applied to the microprocessor 124 through a user interface 128. Further, the microprocessor 124 receives the auxiliary data from the TS decoder 108, whereby such auxiliary data contain the program specification information (PSI) as the table containing program related information stipulated by the MPEG2 standard, and/or the above-mentioned EPG information, etc.

The memory 126 includes a ROM (Read Only Memory) for storing the program of the microprocessor 124, a RAM (Random Access Memory) for temporarily storing data resulting from the program execution of the microprocessor 124, and an EEPROM (Electrically Erasable and Programmable ROM) for storing various reference data.

The above tuner 102, IF module 104, channel decoder 106, TS decoder 108, audio decoder 110, audio processing/generating unit 112, video decoder 116, OSG mixer 118, video processing/generating unit 120, and memory 126 are connected with the microprocessor 124 through a bus 136.

Figure 2:
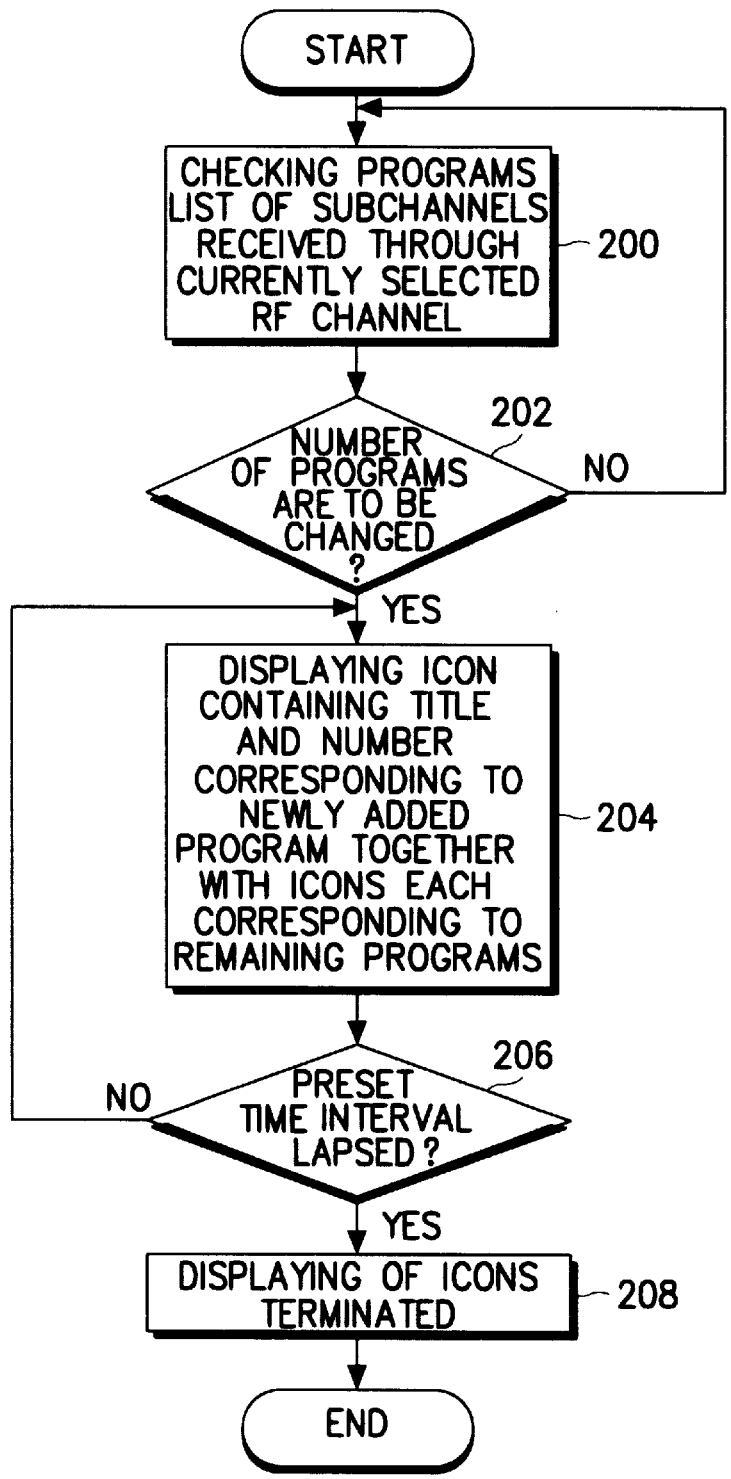
FIG. 2 is a process flow chart of the embodiment to be applied to the HDTV receiver as the digital TV set according to the embodiment of the present invention.

The operations according to the process flow chart as shown in FIG. 2 are programmed and stored in the memory 126 so as to be performed by the microprocessor 124 of FIG. 1.

Referring to FIGS. 1 and 2, in steps 200–202, the microprocessor 124 checks whether the number of programs are to be changed by checking the program specification information or the EPG information contained in auxiliary data supplied from the TS decoder 108 for a programs list of subchannels received through the RF channel currently selected, and when the number of programs are changed, the microprocessor 124 proceeds to step 204.

In step 204, the microprocessor 124 displays icons including titles and numbers of newly added programs together with icons corresponding to remaining programs respectively on the screen by means of the OSG mixer 118.

Figure 3:
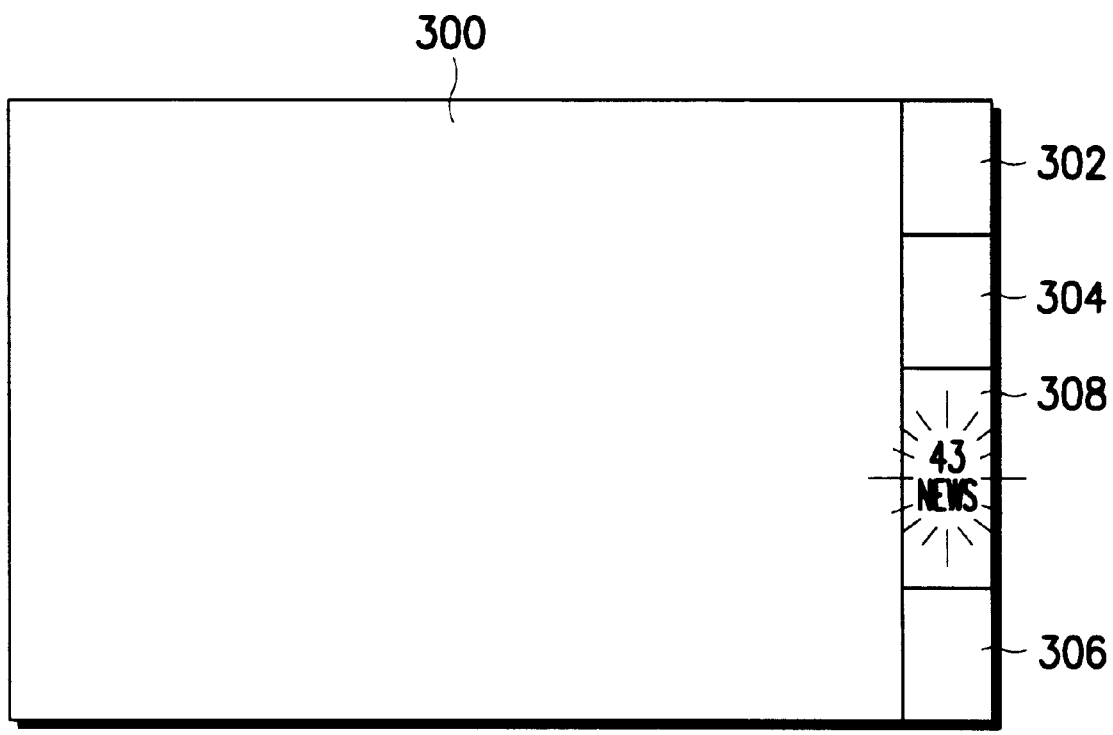
FIG. 3 is a descriptive diagram of a TV screen displaying program information of channels based upon a program change according to the embodiment of the present invention.

FIG. 3 illustrates a TV screen displaying an icon 308 corresponding to a newly added program together with icons corresponding to the remaining existing programs 302–306 independent of the main screen 300, assuming that the title of the newly added program is "news" and the program number is "43". The icons 302–308 are displayed by arranging the icons 302–308 in numerical order of the program numbers, and only the icon corresponding to a newly added program is blinking so as to be distinguished from the remaining existing icons 302–306. Thus, when the programs of the subchannels are changed while the user is watching TV, the user can be immediately informed thereof.

As described above, after starting to display program information and icons 302–308 according to the program change, the microprocessor 124 checks in step 206 whether a preset time interval has lapsed, and terminates the display of the icons 302–308 in step 208 when the preset time interval is lapsed.

Although the present invention has been described with reference to a concrete embodiment, it will be noted that various modifications may be made without departing the gist of the present invention. Particularly, the above embodiment of the present invention shows an example with respect to an HDTV receiver, but the present invention can be applied to all the digital multichannel TV receivers. According to the above embodiment, when a new program is added, the corresponding icon displayed on the screen includes both the title and the channel (program) number of the newly added program, but it is also possible to display the icon containing either the title or the program number. Therefore, the scope of the present invention must be determined by the appended claims covering all such changes and modifications which fall within the true spirit and scope of the present invention.

As described above, the present invention has the advantage that when programs of subchannels are changed while the user is watching TV, the user can be immediately informed thereof and conveniently watch available TV programs.

What is claimed:

1. A method of displaying subchannel information of subchannels of a currently selected RF channel on a television (TV) screen, comprising the steps of:

detecting a list of broadcasting programs of the subchannels of the currently selected RF channel, and checking whether a total number of the broadcasting programs are changed; and displaying the subchannel information about newly added broadcasting programs to the currently selected RF channel on the TV screen when the total number of the broadcasting programs are changed.

2. The method of displaying subchannel information as claimed in claim 1, wherein said displaying step comprises the step of displaying an icon corresponding to a title of the newly added program on the TV screen.

3. A method for displaying subchannel information as claimed in claim 1, wherein said displaying step comprises the step of displaying an icon corresponding to a program number of each newly added broadcasting program on the TV screen.

4. The method of displaying subchannel information as claimed in claim 3, wherein said displaying step comprises the steps of:

displaying the icon corresponding to each newly added broadcasting program together with icons corresponding to all the respective remaining broadcasting programs on the TV screen; and blinking only the icon corresponding to each newly added broadcasting program.

5. The method of displaying subchannel information as claimed in claim 4, wherein said step of displaying the icon corresponding to each newly added program together with icons corresponding to all the respective remaining broadcasting programs comprises the step of displaying the icons on the TV screen by arranging the icons in numerical order corresponding to the program numbers of the broadcasting programs.

6. The method of displaying subchannel information as claimed in claim 5, further comprising the step of terminating the displaying step of the icons when a preset time interval has lapsed after starting the display of the icons.

7. A method of displaying subchannel information of subchannels of a currently selected RF channel on a television (TV) screen, comprising the steps of:

determining a list of broadcasting programs of the subchannels of the currently selected RF channel;

checking whether any change occurs in the list of broadcasting programs; and displaying information on each of the broadcasting programs remaining in the list of broadcasting programs on the TV screen in response to any change occurring the list of broadcasting programs.

8. The method as claimed in claim 7, wherein said displaying information step comprises the steps of:
   displaying icons corresponding to the remaining broadcasting programs on the TV screen; and
   blinking the icon of each newly added broadcasting program in the list.

9. The method as claimed in claim 7, wherein each icon includes at least one of a title and a program number of the corresponding broadcasting program.

10. The method as claimed in claim 7, wherein said displaying information step comprises the step of displaying the information on each of the remaining broadcasting programs on the TV screen, while simultaneously displaying one of the remaining broadcasting programs on the TV screen.

11. A television (TV) receiver to receive a digital RF channel having a plurality of subchannels, and including a TV screen to display information indicative of the subchannels, the TV receiver comprising:
   a decoding unit to decode the digital RF channel including the plurality of subchannels, to generate decoded RF channel data and a list of broadcasting programs of the subchannels; and
   a processor to determine a change in the list of the broadcasting programs and to display the information of each newly added broadcasting program to the list in response to the change in the list.

12. The TV receiver as claimed in claim 11, wherein said processor displays icons of each of the broadcasting programs remaining in the list, including each newly added broadcasting program, on the TV screen.

13. The TV receiver as claimed in claim 12, wherein said processor blinks the icon of each newly added broadcasting program on the TV screen.

14. The TV receiver as claimed in claim 11, wherein said processor simultaneously displays the information of each newly added broadcasting program with one of the broadcasting programs on the TV screen.

15. The TV receiver as claimed in claim 11, wherein said decoding unit comprises:
   a tuner to select the digital RF channel, and in response, generates an intermediate frequency signal;
   an IF modulate to convert the intermediate frequency signal to a baseband signal;
   a channel decoder to convert the baseband signal to a channel signal having data bit strings; and
   a transport stream decoder to separate the data bit strings into video data and auxiliary data including the list of the broadcasting programs;
   said transport stream decoder transmitting the auxiliary data to said processor.

16. The TV receiver as claimed in claim 15, further comprising an On Screen Graphic (OSG) mixer to mix OSG data with the video data, under control of said processor, to display the information of each newly added broadcasting program to the list.

* * * * *

UNITED STATES PATENT AND TRADEMARK OFFICE
CERTIFICATE OF CORRECTION

PATENT NO. : 6,104,436  
DATED : August 15, 2000  
INVENTOR(S) : Hyoung-Joo Lee

It is certified that error appears in the above-identified patent and that said Letters Patent is hereby corrected as shown below:

Column 5,
Line 8, change "program" to -- channel --.

Signed and Sealed this

Seventh Day of August, 2001

*Attest:*

NICHOLAS P. GODICI
*Attesting Officer*    *Acting Director of the United States Patent and Trademark Office*